(12) United States Patent
Humfeld et al.

(10) Patent No.: US 10,752,336 B2
(45) Date of Patent: Aug. 25, 2020

(54) COMPOSITE SUPPORT STRUCTURES FOR COMPOSITE INTEGRATED STRUCTURE

(71) Applicant: THE BOEING COMPANY, Chicago, IL (US)

(72) Inventors: Keith D. Humfeld, Federal Way, WA (US); Scott D. Hartshorn, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 462 days.

(21) Appl. No.: 15/647,475

(22) Filed: Jul. 12, 2017

(65) Prior Publication Data
US 2019/0016438 A1    Jan. 17, 2019

(51) Int. Cl.
| | |
|---|---|
| *B29C 70/06* | (2006.01) |
| *B64C 3/20* | (2006.01) |
| *B64C 3/26* | (2006.01) |
| *B29C 70/30* | (2006.01) |
| *B32B 5/26* | (2006.01) |
| *B29D 24/00* | (2006.01) |
| *B29D 99/00* | (2010.01) |
| *B29L 31/30* | (2006.01) |

(52) U.S. Cl.
CPC ............ *B64C 3/20* (2013.01); *B29C 70/06* (2013.01); *B29C 70/30* (2013.01); *B29D 24/008* (2013.01); *B29D 99/0014* (2013.01); *B32B 5/26* (2013.01); *B64C 3/26* (2013.01); *B29L 2031/3085* (2013.01); *B32B 2305/073* (2013.01); *B32B 2305/076* (2013.01); *B32B 2605/18* (2013.01)

(58) Field of Classification Search
CPC ....................................................... B29C 70/06
USPC ............................................................ 428/131
See application file for complete search history.

(56) References Cited

U.S. PATENT DOCUMENTS

| | | | |
|---|---|---|---|
| 7,228,611 B2 | 6/2007 | Anderson et al. | |
| 9,144,944 B1 * | 9/2015 | White | ................ B29C 35/0288 |
| 2012/0308768 A1 | 12/2012 | Mishra et al. | |

* cited by examiner

*Primary Examiner* — Brent T O'Hern
(74) *Attorney, Agent, or Firm* — Marshall, Gerstein & Borun LLP (57) ABSTRACT

An apparatus includes a first composite support structure and a second composite support structure. The first and second composite support structures are in a predetermined position relative to one another. The apparatus further includes an uncured pre-preg ply, wherein: the uncured pre-preg ply overlies at least a portion of the first composite support structure; the uncured pre-preg ply overlies at least a portion of the second composite support structure; and the first and second composite support structures are each stiffer than the uncured pre-preg ply.

35 Claims, 9 Drawing Sheets

COMPOSITE SUPPORT STRUCTURES FOR COMPOSITE INTEGRATED STRUCTURE

FIELD

This disclosure relates to a composite structure and more particularly to fabricating a complex composite structure.

BACKGROUND

Manufacturing a complex composite structure, such as for example in the fabrication of an aircraft or large portions of an aircraft, require a large number of composite parts to be separately fabricated and secured together. With fabricating a large number of composite parts, there needs to be close adherence to tolerances for each of those parts in order for the parts to fit to adjacent parts, for the parts to optimally secure to one another and to provide a desired shape for the completed complex composite structure.

Once the individual parts are fabricated, the parts need to be assembled and fastened together to complete the complex structure. Fasteners are used to secure together the composite parts in fabricating the complex composite structure. Use of fasteners adds manufacturing steps such as drilling and installation of the fastener assemblies and which also add weight to the finished complex composite structure. The employment of fasteners not only adds to labor costs associated with installation of the fasteners but in some instances where a fastening is applied locations are created in which sealant may need to be applied. Composite parts can be bonded together, but the testing requirements for satisfying the FAA requirements are sufficiently burdensome that this mode of securement is generally avoided for the primary structure of an aircraft. Also, when bonding is employed for assembling a complex composite structure frequently fasteners are also used.

There is a need to be able to fabricate complex composite final structures where the need for bonding or use of fasteners is eliminated. In addition, there is a need to reduce the occurrence of exposing carbon fibers. With drilling holes into composite parts in order to employ fasteners for securing the parts, the drilling undesirably exposes the fibers of the composite material. Carbon fibers of composite material are more electrically conductive than the resin of the composite material. Exposed carbon fiber ends are sources of sparks during high voltage events such as a lightning strike. As a result, carbon fibers requires sealing so as to prevent sparking and any fuel ignition. In an example of fabrication of complex structures, such as in the manufacturing of an aircraft, there is a need, as mentioned above, for reducing expensive sealing operations. Sealing operations are required, for example, in joining and securing separate parts in the fabrication of items such as a fuel tank. There is also a need to avoid the added weight, cost, manufacturing process and manufacturing time to an aircraft that occurs in providing, for example, access holes in the wing boxes used in a fuel tank sealant process. In addition, there is a need to reduce the occurrence of deformation of a composite structure as a result of the curing process.

SUMMARY

An example includes an apparatus which includes a first composite support structure and a second composite support structure wherein the first and second composite support structures are in a predetermined position relative to one another. The apparatus further includes an uncured pre-preg ply, wherein the uncured pre-preg ply overlies at least a portion of the first composite support structure; the uncured pre-preg ply overlies at least a portion of the second composite support structure; and the first and second composite support structures are each stiffer than the uncured pre-preg ply.

An example includes a method which includes steps of positioning a first composite support structure and a second composite support structure into a predetermined position relative to one another. The method further includes laying up an uncured pre-preg composite ply onto at least a portion the first composite support structure and onto at least a portion of the second composite support structure connecting the first and second composite support structures together, wherein the first and second composite support structures are each stiffer than the uncured pre-preg ply.

The features, functions, and advantages that have been discussed can be achieved independently in various embodiments or may be combined in yet other embodiments further details of which can be seen with reference to the following description and drawings.

DESCRIPTION

Figure 1:
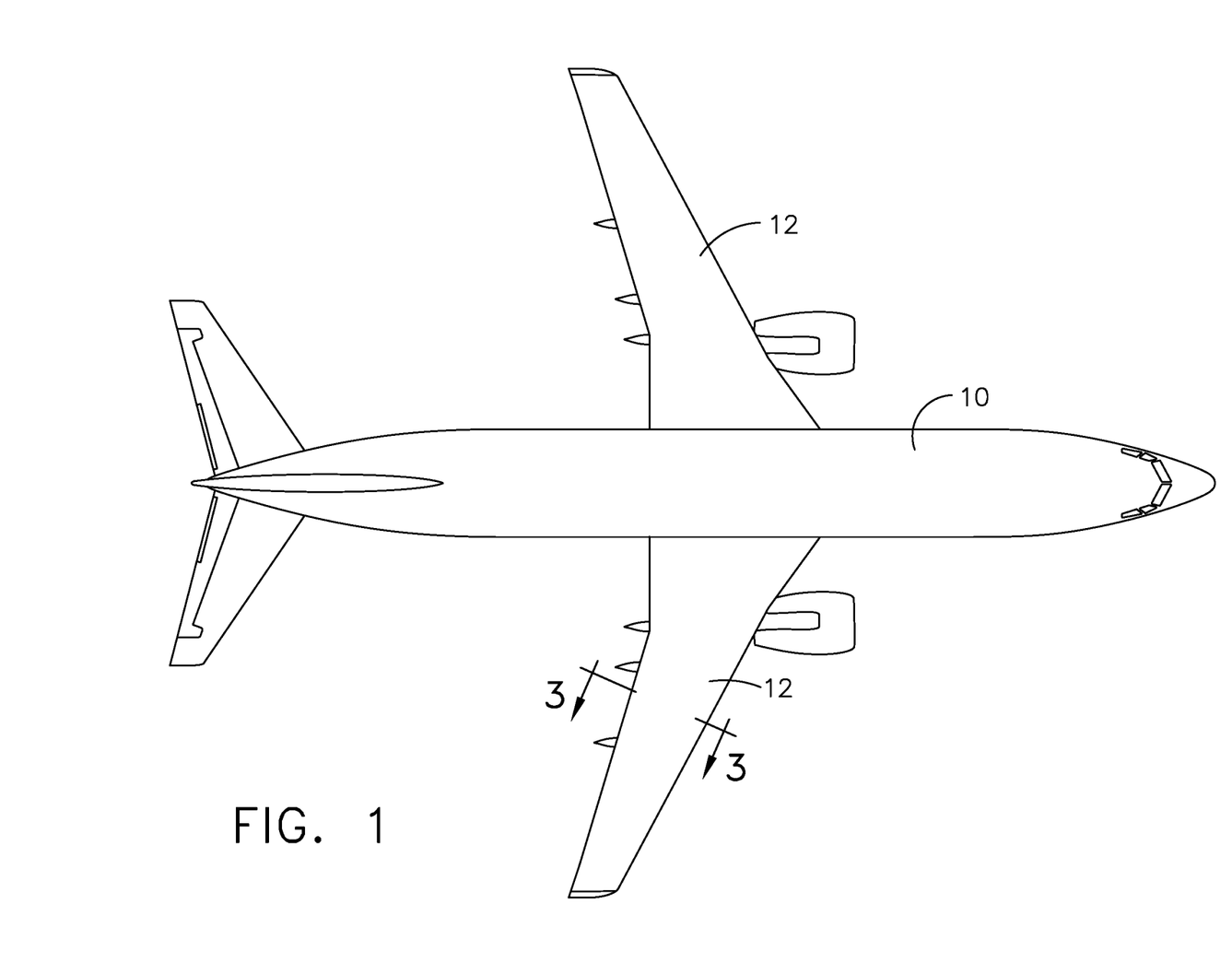
FIG. 1 is a top plan view of an aircraft.

In referring to FIG. 1, many portions of aircraft 10 are constructed of composite material. Current fabrication of aircraft 10 includes making a plurality of individual finished composite parts and assemble and fasten them together in constructing larger complex composite structures of aircraft 10. It would be advantageous to fabricate larger complex composite structures of aircraft 10 without needing to utilize fasteners and alleviating the need to adhere to high tolerance requirements demanded by use of a large number of finished parts used to construct larger complex structures of aircraft 10. It would be further advantageous to construct aircraft 10 and eliminate the need for sealing operations such as needed in constructing a fuel tank which would normally involve fastening multiple parts together which have seams between the parts which require seals. The reduction of the use of fasteners reduces the weight of aircraft 10, reduces the labor costs associated with installation of the fasteners and reduce the need to address the highly conductive fiber ends from composite parts which have been drilled to employ fasteners. The present disclosure discussed herein provides these needed advantages in fabricating complex composite structures. This discussion will utilize wing 12 of aircraft 10 as an example of the construction of a large complex composite structure.

Figure 2:
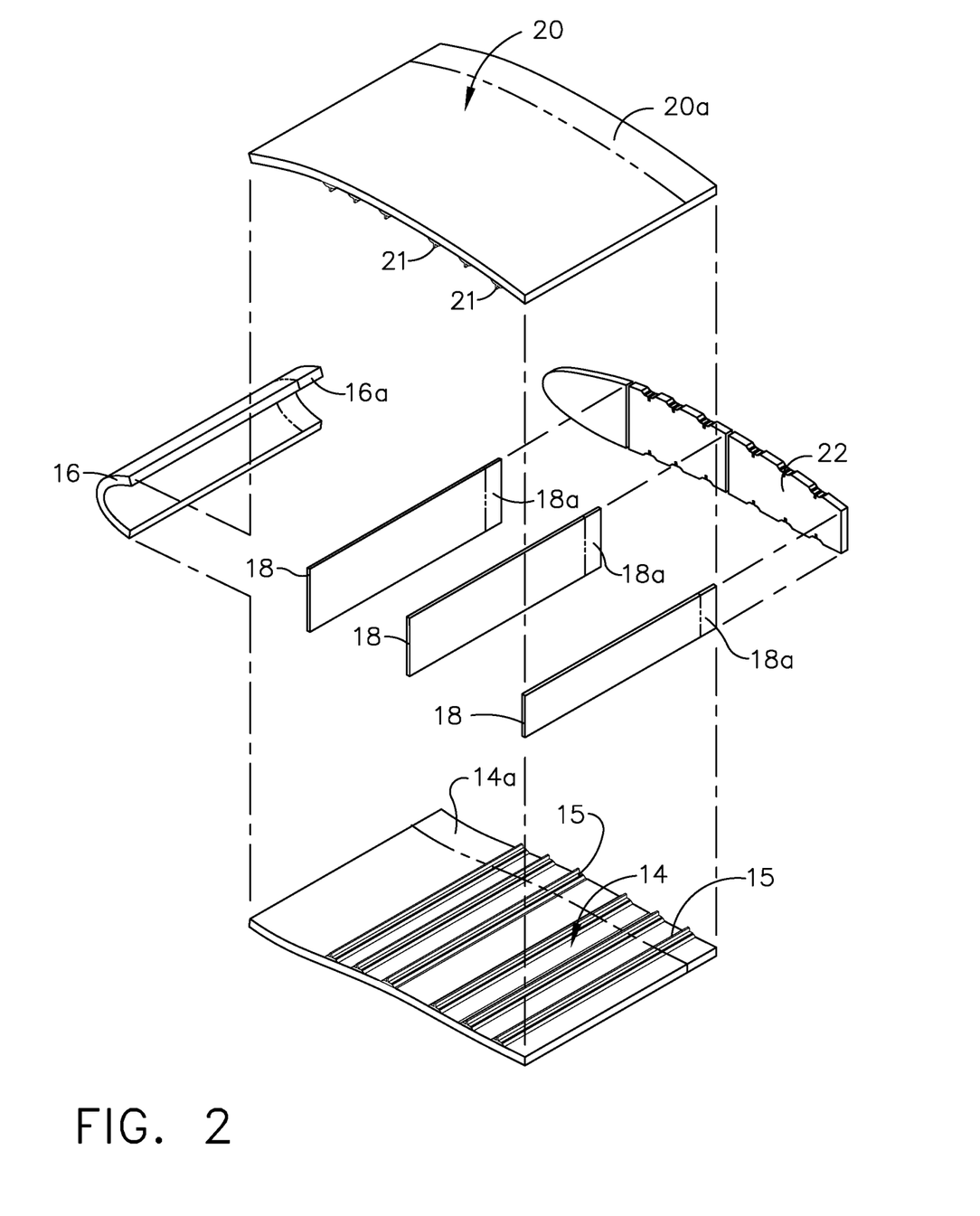
FIG. 2 is a partial perspective exploded view of a wing of the aircraft of FIG. 1 prior to layup of pre-preg plies on spars and wing skin composite support structures.

In referring to FIG. 2, a portion of wing 12 is shown in an exploded view proximate to cross section line 3-3 as shown in FIG. 1. In this exploded representation of wing 12, at least a few of the parts shown are composite support structures that will become part of wing 12 after a layup of composite pre-preg plies are applied to the composite support structures which will be discussed herein. In this example, composite support structures are constructed of composite material and generally has a thinner construction than the final finished portion of aircraft 10 wherein the final finished portion will include the composite support structures connected and completed with pre-preg plies laid up upon the composite support structures and cured.

Figure 3:
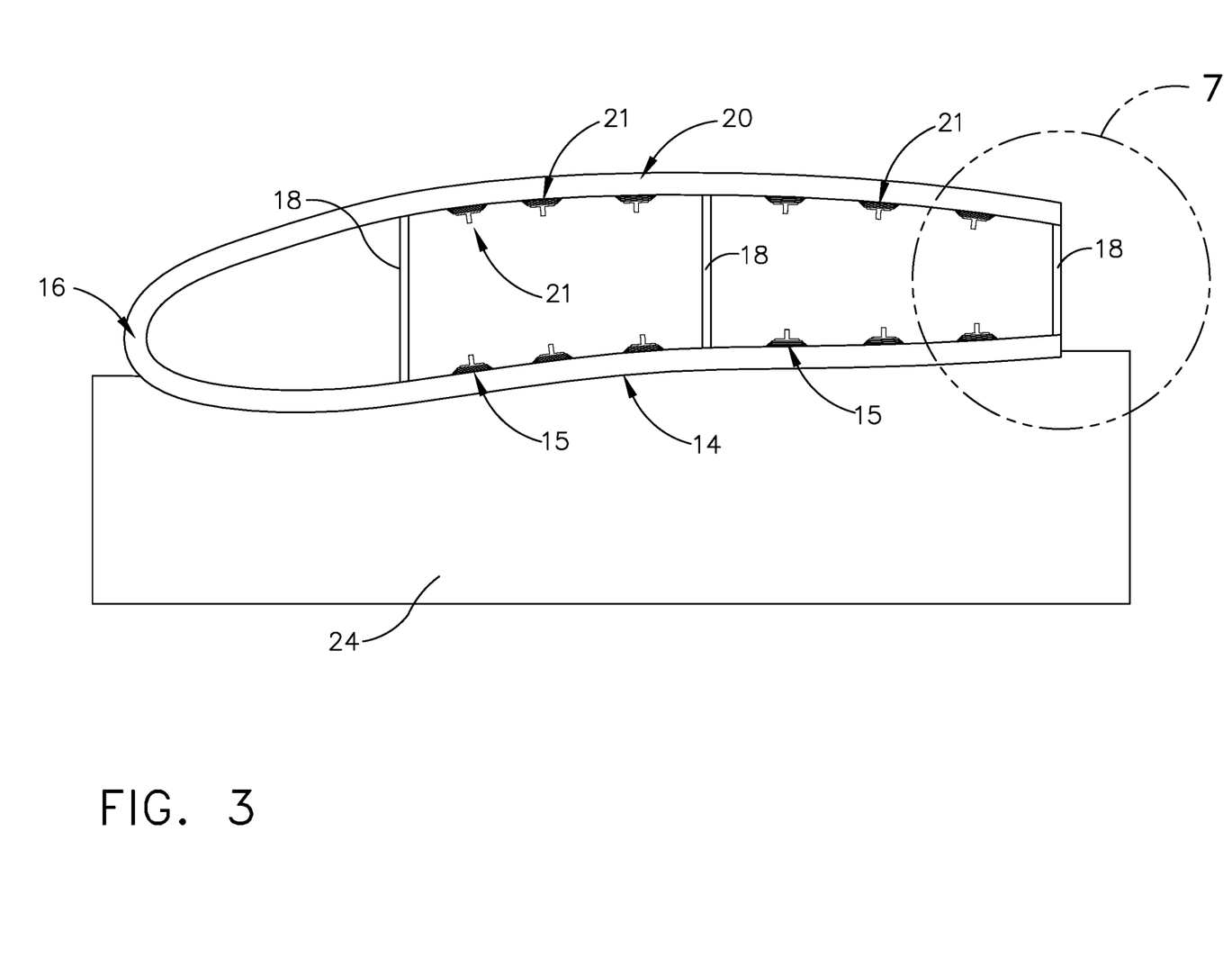
FIG. 3 is an assembled end view of FIG. 2 with a support tool supporting a lower skin portion composite support.
Figure 4:
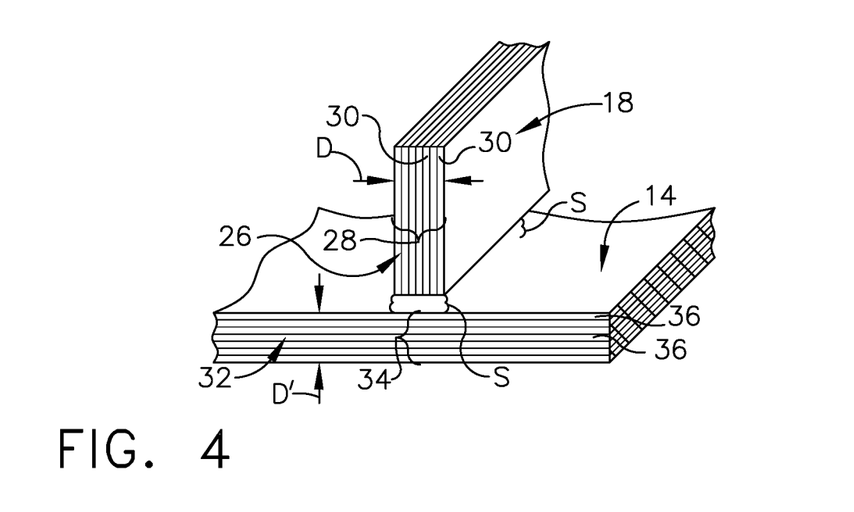
FIG. 4 is a schematic partial perspective view of spar and wing skin composite support structures prior to application of pre-preg plies wherein the spar composite support structure is spaced apart from the skin composite support structure.
Figure 5:
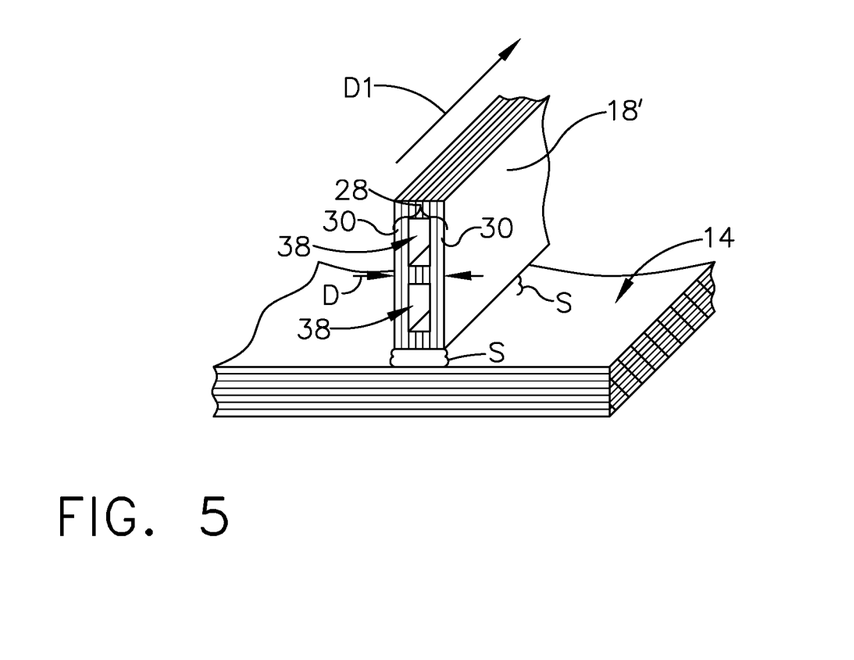
FIG. 5 is a second example of the spar composite support structure of FIG. 4.

In referring to FIG. 2, in this example, composite support structures include, lower skin portion support 14 with blade stringer supports 15, nose support 16, spar supports 18 and upper skin portion support 20 with blade stringer supports 21. Rib 22, in this example, is a completed finished composite part and will be secured to the composite wing 12 assembly with fasteners. In referring to FIG. 3, an end view of these composite support structures are shown in a predetermined position for further fabrication, which includes laying up uncured pre-preg plies which will be discussed in more detail herein. Lower skin portion support 14 with blade stringer supports 15 are positioned within a conventional layup support tool 24, as seen in FIG. 3, and the remainder of composite support structures, nose support 16, spar supports 18, upper skin portion support 20 with stringer supports 21 are held in a predetermined position for further layup fabrication. In some instances, the composite support structures are selectively positioned in contact with an adjacent composite support structure as seen in FIG. 3. In other instances, composite support structures, such as seen in FIGS. 4-6 for various examples of spar support 18 and lower skin portion support 14, are selectively positioned spaced apart as seen at S from one another for further layup fabrication.

Regardless of whether the composite support structures are selectively in contact with one another or spaced apart from one another, they are held in position for further layup fabrication with being held by a portion of each of the composite support structures which extends from each of the composite support structures to be discussed herein. Other layup support tools can be employed such as layup support tool 24 as seen in FIG. 3. As can be appreciated, the assembly of complex composite structures can be achieved without the higher tolerance demands of fabricating individual parts and then fastening the individual parts together. Under the fabrication herein, the composite support structures can be positioned in a predetermined position relative to one another and uncured pre-preg plies can be applied to the composite support structures connecting and securing the composite support structures together.

For purposes of the example of the apparatus being fabricating herein, spar support or first composite support structure 18 will be used in conjunction with lower skin portion support or second composite support structure 14. In this example, blade stringer supports 15 are carried on lower skin portion support or second composite support structure 14. In referring to FIG. 4, first lateral side 26 of the first composite support structure or spar support 18, includes first stack 28 of composite plies 30 wherein first stack 28 extends first thickness dimension D of first composite support structure or spar 18. Second lateral side 32 of second composite support structure or lower skin portion 14 includes second stack 34 of composite plies 36 wherein second stack 34 extends second thickness dimension D' of second composite support structure or lower skin portion 14. In referring to FIG. 5, a second example of first composite support structure or spar support 18' is shown. First stack 28 of composite plies 30 defines opening 38 which extends in a direction D1 transverse to first thickness dimension D and into first composite support structure or spar support 18'. This construction provides opening 38 to receive a portion of an adjacent part in facilitating the assembly and securement of a complex composite structure.

Figure 6:
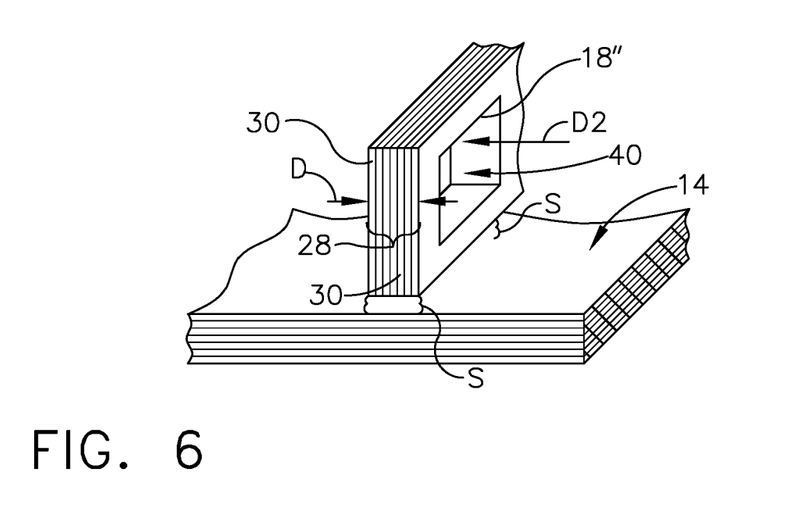
FIG. 6 is a third example of the spar composite support structure of FIG. 4.

In referring to FIG. 6, a third example of first composite support structure or spar support 18" is shown. First composite support structure or spar support 18" defines opening 40 which extends through first composite support structure or spar support 18" in a direction D2 along first thickness dimension D of stack 28. This configuration for spar support 18" provides for a pre-preg ply that is draped over spar support 18" to join or connect to one another through opening 40. This contact of pre-preg ply facilitates for a strong connection through spar support 18" provides a beneficially strengthened finished spar.

First and second composite support structures 18 and 14 are each stiffer than uncured pre-preg ply that will be laid up on first and second composite support structures 18 and 14. First and second support structures 18, 14 will need to support the weight and resist deformation of a plurality of composite pre-preg plies that may be stacked upon first and second support structures 18 and 14 during the fabrication of the complex composite structure that in this example includes at least a substantial portion of wing 12 of aircraft 10. As a result, as in this example, first composite support structures 18 includes one of cured or partially cured composite material. Similarly, second composite support structure 14 includes one of cured or partially cured composite material. With first and second support structures 18, 14 in either a partially cured state such as stage B or is cured, first and second support structures 18, 14 are stiffer than uncured pre-preg plies that would be laid up on first and second composite support structures 18, 14 and provide the needed resistance against weight of the uncured pre-preg plies that could otherwise cause deformation of the pre-preg plies overlying first and second composite support structures 18, 14.

As discussed earlier, first and second composite support structures 18, 14 are positioned in a predetermined position, which occurs prior to commencing laying up of uncured pre-preg plies. As seen in FIG. 3, first and second composite support structures 18, 14 are positioned in contact with one another. In another example, as seen in FIG. 4, first and second composite support structures 18, 14 are positioned spaced S apart from one another. In the fabrication process, the fabricator will utilize holding equipment to selectively grasp and hold the composite support structures in position for receiving the layup of uncured pre-preg plies. For example first composite support structure or spar support 18, as seen in FIG. 2 has portion 18a which is an extension from spar support 18. Portion 18a provides a holding apparatus something to grasp in holding spar support 18 and provides the holding apparatus the clearance from spar support 18 to remain out of the way of subsequent layup of uncured pre-preg plies. Similarly this is the case for second composite support structure or lower skin portion support 14 having portion 14*a*, which is an extension from lower skin portion support 14, provides a holding apparatus something to grasp and provides the holding apparatus the clearance from lower skin portion support 4 to remain out of the way of subsequent layup of uncured pre-preg plies. This is similarly the case for nose support 16 which provides portion 16*a* and upper skin portion support 20 which provides portion 20*a*. In both of these cases portions 16*a* and 20*a* provide a holding apparatus something to grasp and at the same provide a holding apparatus the opportunity to remain out of the way of subsequent layup of uncured pre-preg plies.

Figure 7:
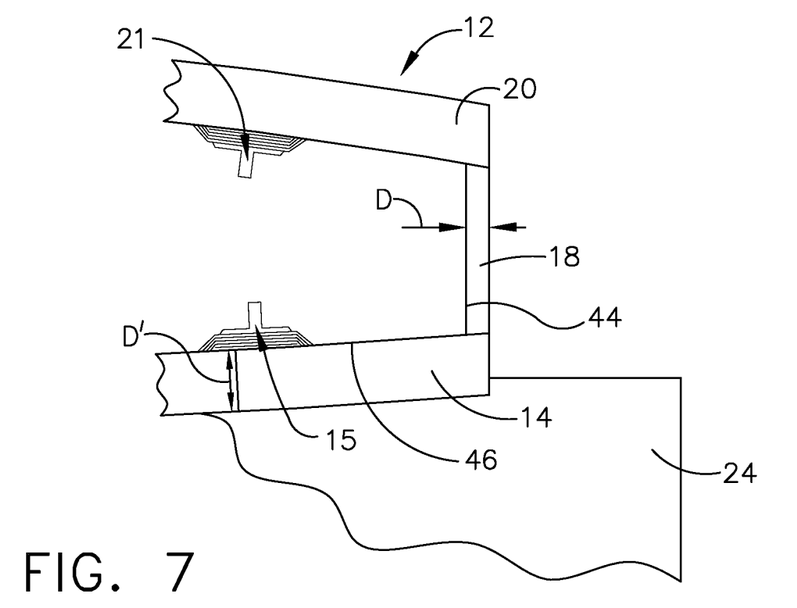
FIG. 7 is a partial enlarged view of that which is encircled and designated as 7 in FIG. 3.
Figure 8:
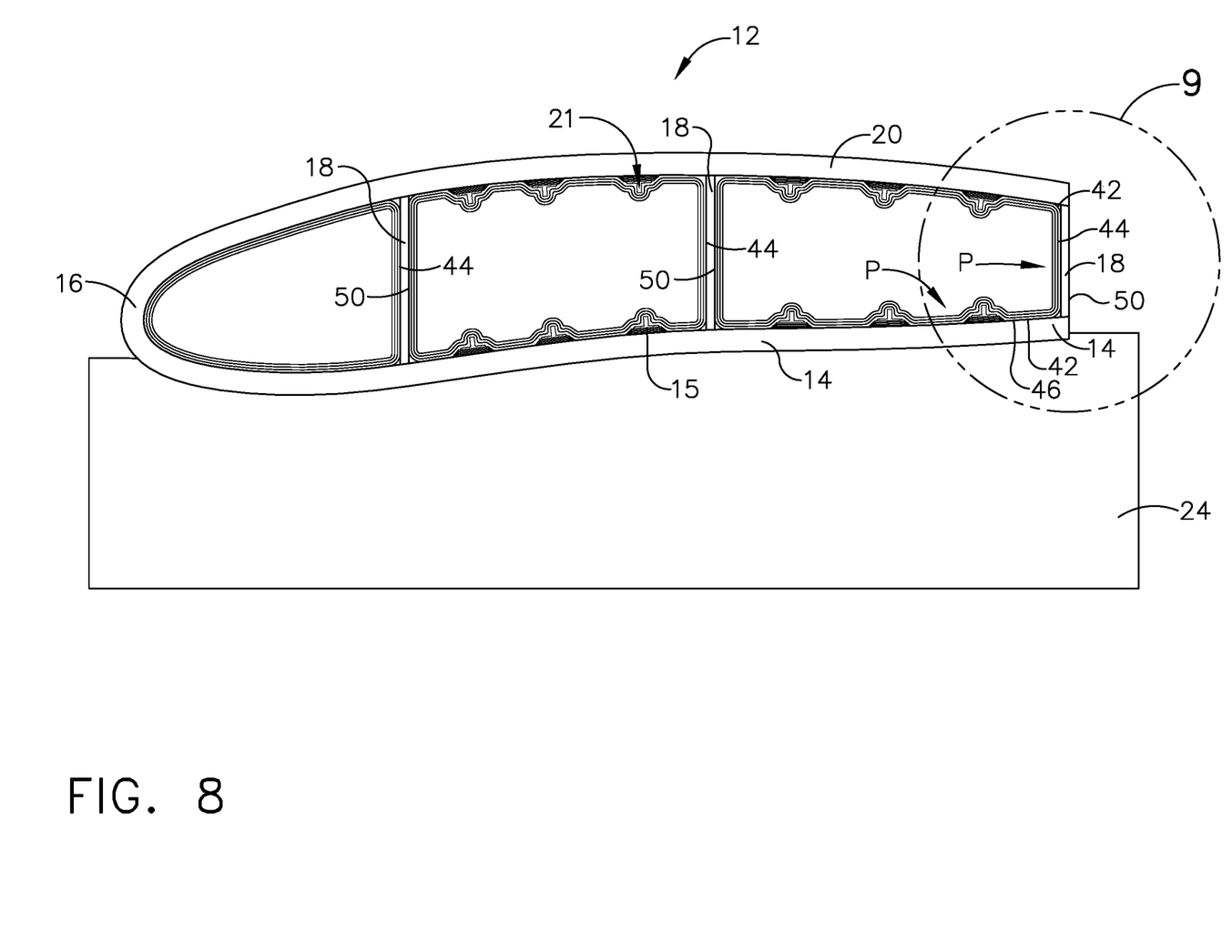
FIG. 8 is a view of FIG. 3 with pre-preg plies overlying spar composite support structures and wing skin composite support structures.
Figure 9:
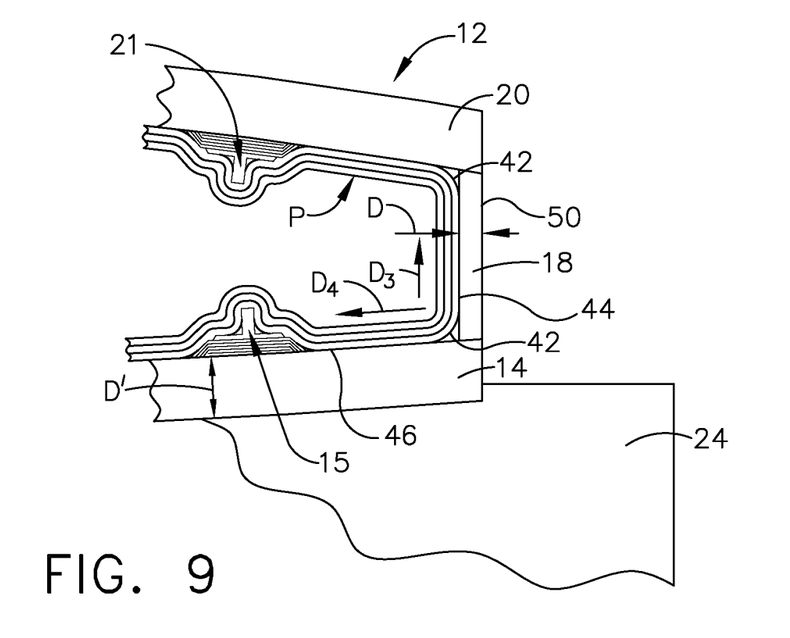
FIG. 9 is a partial enlarged view of that which is encircled and designated as 9 in FIG. 8.

With composite support structures such as first support structure or spar support 18 and second support structure or lower skin portion support 14 held in a predetermined position, as seen in FIGS. 3 and 7, completing assembly of a complex composite structure of the present example of a portion of aircraft 10 wing 12 can go forward. Uncured pre-preg ply 42 is then applied, as seen in FIGS. 8 and 9. As can be seen in FIGS. 8 and 9 pre-preg ply 42 overlies at least a portion of first side 44 of first composite support structure 18 pre-preg ply 42 and overlies at least a portion of first side 46 of second composite support structure 14. Uncured pre-preg ply 42 extends in a direction D3 transverse to the first thickness dimension D of first composite support structure 18, as seen in FIG. 9, and extends in a direction D4 transverse to second thickness dimension D' of second composite support structure 14. The uncured pre-preg ply 42 connects first and second composite support structures 18, 14. In fabrication of a complex composite structure uncured pre-preg ply 42 further includes a plurality of uncured pre-preg plies P. Plurality of uncured pre-preg plies P are positioned in overlying relationship with respect to at least a portion of the first side 44 of the first composite support structure 18 and are positioned in overlying relationship with respect to at least a portion of first side 46 of second composite support structure 14.

Figure 10:
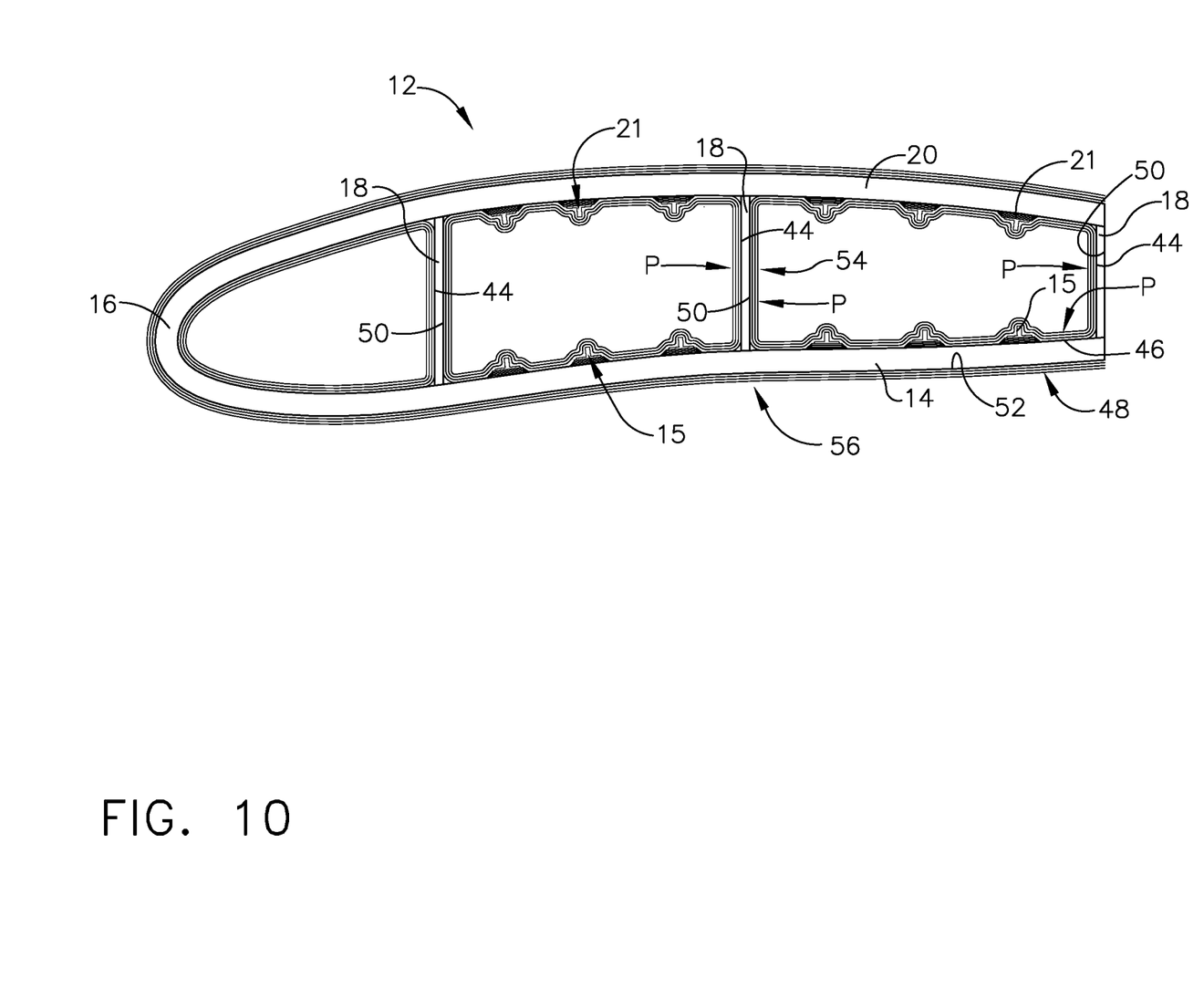
FIG. 10 is another example of FIG. 8 with pre-preg plies overlying outer surface of wing skin support structures.

In referring to FIG. 10, with plurality of pre-preg plies P in overlying relationship with respect to at least a portion of first side 44, 46 of first and second composite support structures 18, 14, respectively, cured, a second plurality of uncured pre-preg plies 48 are positioned in overlying relationship with respect to one of at least a portion of second side 50 of first composite support structure 18 and at least a portion of second side 52 of second composite support structure 14. In this example, uncured pre-preg plies 48 are positioned in overlying relationship with respect to at least a portion of second side 52 of second composite support structure 14. In this example, pre-preg plies 48 are positioned on an outside aero surface of wing 12.

As described above, composite support structures are positioned in a pre-determined position relative to one another and held in position. Pre-preg plies are applied to overlie two adjacent composite support structures and at the same time build up that composite support structure into a finished portion of a complex composite structure. For example, spar 54, as seen in FIG. 10, of wing 12 of aircraft 10 includes first composite support structure or spar support 18 which has in this example, plurality of pre-preg plies P positioned in overlying relationship relative to opposing sides of spar support 18. Similarly, skin 56 of wing 12 of aircraft 10 includes second composite support structure or lower skin portion support 14 which has in this example, plurality of pre-preg plies P positioned in overlying relationship relative to opposing sides of lower skin portion support 14. In this construction, composite structure supports, which have a thinner construction than a finished portion being fabricated, become an integrated portion of a complex composite structure with uncured pre-preg plies laid up on the composite support structures and being cured. This construction provides for the elimination of fasteners, reduced labor, reduced weight to an aircraft and reduction of sealant processes. Moreover, with the proper orientation of the composite support structures with respect to the laid up pre-preg plies, a reduction of deformation with respect to the cured complex composite structure can be obtained.

Figure 11:
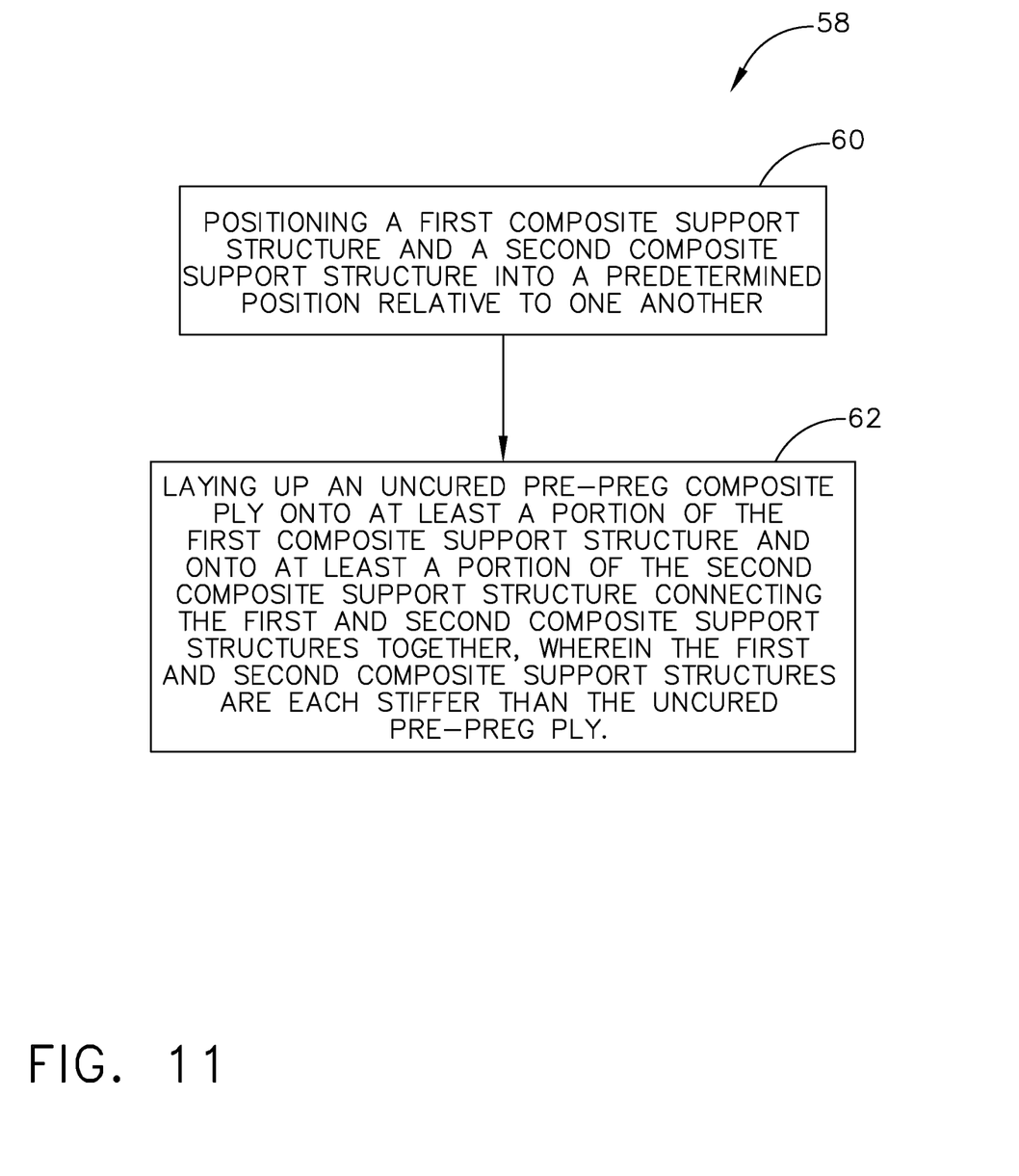
FIG. 11 is a flow chart of a method for laying up a composite structure.

Further included is method 58 for laying up a composite structure, as shown in FIG. 11. Method 58 includes step 60 of positioning first composite support structure 18 and second composite support structure 14 into a predetermined position relative to one another. Method 58 further includes step 62 of laying up an uncured pre-preg composite ply 42 onto at least a portion of the first composite support structure 18 and onto at least a portion of the second composite support structure 14 connecting first and second composite support structures 18, 14 together, wherein first and second composite support structures 18, 14 are each stiffer than uncured pre-preg ply 42.

Step 60 of positioning further includes first composite support structure 18 includes one of cured or partially cured composite material and second composite support structure 14 includes one of cured or partially cured composite material. Additionally, step 60 of positioning further includes predetermined position including one of first and second composite support structures 18, 14 are spaced apart from one another or first and second composite support structures 18, 14 are in contact with one another.

Step 62 of laying up further includes laying up a first plurality of uncured pre-preg plies P in overlying relationship with respect to at least a portion of first side 44 of first composite support structure 18, as seen in FIG. 9, and in overlying relationship with respect to at least a portion of first side 46 of second composite support structure 14. Step 62 of laying up further includes curing the first plurality of uncured pre-preg plies P, as representatively seen in FIG. 10, and laying up second plurality of uncured pre-preg plies 48 in overlying relationship with respect to at least one of at least a portion of a second side 50 of first composite support structure 18 and in overlying relationship with respect to at least a portion of second side 52 of second composite support structure 14. In the example shown in FIG. 10, uncured pre-preg plies 48 are positioned on at least a portion of second side 52 of second composite support structure 14.

While various embodiments have been described above, this disclosure is not intended to be limited thereto. Variations can be made to the disclosed embodiments that are still within the scope of the appended claims.

What is claimed:

1. An apparatus, comprising:
   a first composite support structure;
   a second composite support structure wherein the first and second composite support structures are in a predetermined position relative to one another; and
   an uncured pre-preg ply, wherein:
      the uncured pre-preg ply overlies at least a portion of a first side of the first composite structure;
      the uncured pre-preg ply overlies at least a portion of a first side of the second composite structure; and
      the first and second composite support structures are each stiffer than the uncured pre-preg ply, such that an integrated structure of the uncured pre-prep ply and the first and second composite support structures is formed with curing of the uncured pre-prep ply.

2. The apparatus of claim 1, wherein:
a first lateral side of the first composite support structure comprises a first stack of composite plies wherein the first stack extends a first thickness dimension of the first composite support structure; and
a second lateral side of the second composite support structure comprises a second stack of composite plies wherein the second stack extends a second thickness dimension of the second composite support structure.

3. The apparatus of claim 2, wherein the first stack of composite plies defines an opening which extends in a direction transverse to the first thickness dimension and into the first composite support structure.

4. The apparatus of claim 2, wherein an opening is defined by the first composite support structure and extends through the first composite support structure in a direction along the first thickness dimension.

5. The apparatus of claim 2, wherein the pre-preg ply extends in a direction transverse to the first thickness dimension of the first composite support structure and extends in a direction transverse to the second thickness dimension of the second composite support structure.

6. The apparatus of claim 1, wherein the first composite support structure comprises one of cured or partially cured composite material.

7. The apparatus of claim 1, wherein the second composite support structure comprises one of cured or partially cured composite material.

8. The apparatus of claim 1, wherein the predetermined position includes the first and second composite support structures are positioned spaced apart from one another.

9. The apparatus of claim 1, wherein the predetermined position includes the first and second composite support structures are positioned in contact with one another.

10. The apparatus of claim 1, wherein the first and second composite support structures each comprise a portion which extends from each of the first and second composite support structures.

11. The apparatus of claim 1, wherein the uncured pre-preg ply further includes a plurality of uncured pre-preg plies.

12. The apparatus of claim 11, wherein the plurality of uncured pre-preg plies are positioned in overlying relationship with respect to at least a portion of the first side of the first composite support structure and in overlying relationship with respect to at least a portion of the first side of the second composite support structure.

13. The apparatus of claim 12, wherein with the plurality of uncured pre-preg plies positioned in overlying relationship with respect to at least a portion of the first side of the first and second composite support structures cured, a second plurality of uncured pre-preg plies are positioned in overlying relationship with respect to at least a portion of a second side of one of the first composite support structure and to at least a portion of a second side of the second composite support structure.

14. The apparatus of claim 1, a spar of a wing of an aircraft comprises a first composite support structure.

15. The apparatus of claim 1 a skin of a wing of an aircraft comprises a second composite support structure.

16. A method for laying up a composite structure comprising the steps of:
positioning a first composite support structure and a second composite support structure into a predetermined position relative to one another; and
laying up an uncured pre-preg composite ply onto at least a portion of the first composite support structure and onto at least a portion of the second composite support structure connecting the first and second composite support structures together, wherein:
the first and second composite support structures are each stiffer than the uncured pre-preg composite ply; and
with curing the uncured pre-preg composite ply, a cured pre-preg composite ply and the first and second composite support structures are integrated.

17. The method of claim 16, the step of positioning further includes the first composite support structure comprises one of cured or partially cured composite material and the second composite support structure comprises one of cured or partially cured composite material.

18. The method of claim 16, the step of positioning includes the predetermined position including one of the first and second composite support structures are spaced apart from one another or the first and second composite support structures are in contact with one another.

19. The method of claim 16, the step of laying up further includes laying up a first plurality of uncured pre-preg composite plies in overlying relationship with respect to at least a portion of the first side of the first composite support structure and in overlying relationship with respect to at least a portion of the first side of the second composite support structure.

20. The method of claim 19, the step of laying up further includes curing the first plurality of uncured pre-preg composite plies and laying up a second plurality of uncured pre-preg composite plies in overlying relationship with respect to at least a portion of a second side of the first composite support structure and in overlying relationship with respect to at least a portion of a second side of the second composite support structure.

21. The method of claim 16, wherein:
a first lateral side of the first composite support structure comprises a first stack of composite plies wherein the first stack extends a first thickness dimension of the first composite support structure; and
a second lateral side of the second composite support structure comprises a second stack of composite plies wherein the second stack extends a second thickness dimension of the second composite support structure.

22. The method of claim 21, wherein the first stack of composite plies defines an opening which extends in a direction transverse to the first thickness dimension and into the first composite support structure.

23. The method of claim 21, wherein an opening is defined by the first composite support structure and extends through the first composite support structure in a direction along the first thickness dimension.

24. The method of claim 21, wherein the uncured pre-preg composite ply extends in a direction transverse to the first thickness dimension of the first composite support structure and extends in a direction transverse to the second thickness dimension of the second composite support structure.

25. The method of claim 21, wherein the first composite support structure comprises one of cured or partially cured composite material.

26. The method of claim 21, wherein the second composite support structure comprises one of cured or partially cured composite material.

27. The method of claim 21, wherein the predetermined position includes the first and second composite support structures are positioned spaced apart from one another.

28. The method of claim 21, wherein the predetermined position includes the first and second composite support structures are positioned in contact with one another.

29. The method of claim 21, wherein the first and second composite support structures each comprise a portion which extends from each of the first and second composite support structures.

30. The method of claim 21, wherein the uncured pre-preg composite ply further includes a plurality of uncured pre-preg composite plies.

31. The method of claim 30, wherein the plurality of uncured pre-preg composite plies are positioned in overlying relationship with respect to at least a portion of a first side of the first composite support structure.

32. The method of claim 31, wherein the plurality of uncured pre-preg composite plies are positioned in overlying relationship with respect to at least a portion of a first side of the second composite support structure.

33. The method of claim 32, wherein with the plurality of uncured pre-preg composite plies positioned in overlying relationship with respect to at least a portion of the first side of the first and second composite support structures cured, a second plurality of uncured pre-preg composite plies are positioned in overlying relationship with respect to at least a portion of a second side of one of the first composite support structure and to at least a portion of a second side of the second composite support structure.

34. The method of claim 33, wherein the first composite support structure is a portion of a spar of a wing of an aircraft.

35. The method of claim 33, wherein the second composite support structure is a portion of a wing of an aircraft.

* * * * *